Feb. 13, 1940.    J. O. IVIE ET AL    2,190,543
SCOREBOARD
Filed Aug. 14, 1934    7 Sheets-Sheet 1

Fig. 1.

James O. Ivie
Horace Leon Ivie
INVENTORS

BY Victor J. Evans & Co.
ATTORNEY

Feb. 13, 1940.    J. O. IVIE ET AL    2,190,543
SCOREBOARD
Filed Aug. 14, 1934    7 Sheets-Sheet 4

James O. Ivie
Horace Leon Ivie
INVENTORS
BY Victor J. Evans & Co.
ATTORNEY

Feb. 13, 1940. J. O. IVIE ET AL 2,190,543
SCOREBOARD
Filed Aug. 14, 1934 7 Sheets-Sheet 5

James O. Ivie
Horace Leon Ivie
INVENTORS
BY Victor J. Evans & Co.
ATTORNEY

Feb. 13, 1940.  J. O. IVIE ET AL  2,190,543
SCOREBOARD
Filed Aug. 14, 1934  7 Sheets-Sheet 7

James O. Ivie
Horace Leon Ivie  INVENTORS
BY Victor J. Evans & Co.
ATTORNEY

Patented Feb. 13, 1940

2,190,543

UNITED STATES PATENT OFFICE 2,190,543

SCOREBOARD

James O. Ivie and Horace Leon Ivie, Logan, Utah

Application August 14, 1934, Serial No. 739,822

7 Claims. (Cl. 161—17)

This invention relates to scoreboards and has for its object the provision of an apparatus by which the score of a game and all essential information as to its status may be made known to spectators as the game progresses. It is also an object of the invention to provide an apparatus for the stated purpose which may be operated from a remote point so that officials in charge of the game may control the action and insure accuracy in the original announcements and all changes. These stated objects, and other objects which will appear in the course of the following description, are attained in such an apparatus as is illustrated in the accompanying drawings, and the invention consists in certain novel features which will be defined in the appended claims.

The structure shown in the accompanying drawings is designed for use in connection with basket ball games, but the principles involved are suited to automatic signalling and giving information as to other games, such as football, baseball, racing, and other sports, as well as public commercial displays. It is intended that the mechanism be completely sealed and all control be from the remote control unit, thus avoiding tampering with and damage to the working parts. The front wall 1 of the casing may be ornamented as desired and, in its lower portion, in the illustrated design (Figure 1), is provided with two columns of horizontal slots 2 through which the names and numbers of the players are to be displayed, and above each slot is a legend 3, naming the position of the player whose name appears below. Alined with the slots are openings 4 through which are to be displayed numerals corresponding to the number of fouls charged against the respective players, a suitable legend appearing above the column of openings, as at 5. At the opposite side of the column of slots and alined with the slots are pairs of openings 6 through which are to be displayed numbers showing the scores made by the respective players, while above the groups of slots and openings are other openings 7 through which are to be displayed numbers indicating the total scores, legends 8 on the board identifying the two teams playing, the vistors and the home team. In the upper portion of the board, at the center, appears a dial 9 having a graduated margin and bearing the legend "Minutes to play". Within the area of the dial 9 is a "seconds" dial 10 in front of which a hand 11, which revolves in a clockwise direction, will make one revolution per minute, while a hand 12, which likewise revolves in a clockwise direction, in front of the dial 9 will make one revolution in twenty minutes. At the opposite sides of the dial 9 are smaller dials 13 and 14 in front of which hands 15 and 16 respectively rotate in a clockwise direction, the dial 13 being used to measure time taken out and the dial 14 measuring the time permitted for a team to carry the ball from its back court to the forward court. The indicia on each of the four dials is so arranged that a reading of each dial indicates time remaining. At opposite sides of the upper portion of the dial 9 are slots 17 through which are displayed legends 18 designating the instant playing period, as "First quarter". Said legends, the numbers for fouls, and the names and numbers of the players are carried on drums, such as shown at 18 (Fig. 2), mounted on the inner side of the board or wall 1 while the score numbers are on dials 19, also mounted on the inner side of the board, the dials and drums being shifted as required by means which will presently be fully described. The drums are preferably six-sided, the uppermost drums carrying upon their respective sides legends such as "First half", "Third quarter", "First extra period", etc., while the player-designating drums carry the names of the first team players and all substitutes in the order previously determined.

Figure 2:
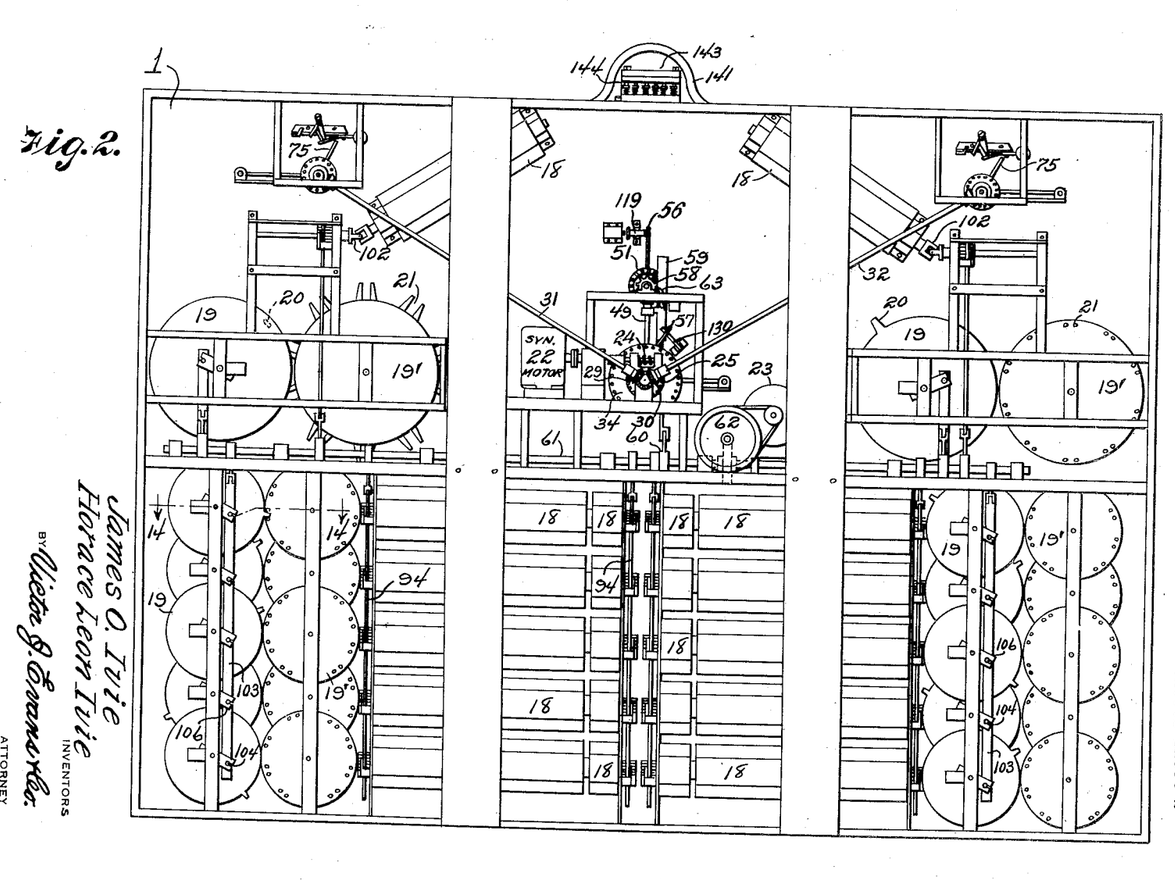
Figure 2 is a rear elevation, the back wall of the casing being removed.
Figures 3, 4, 5, 6, 7, 8:
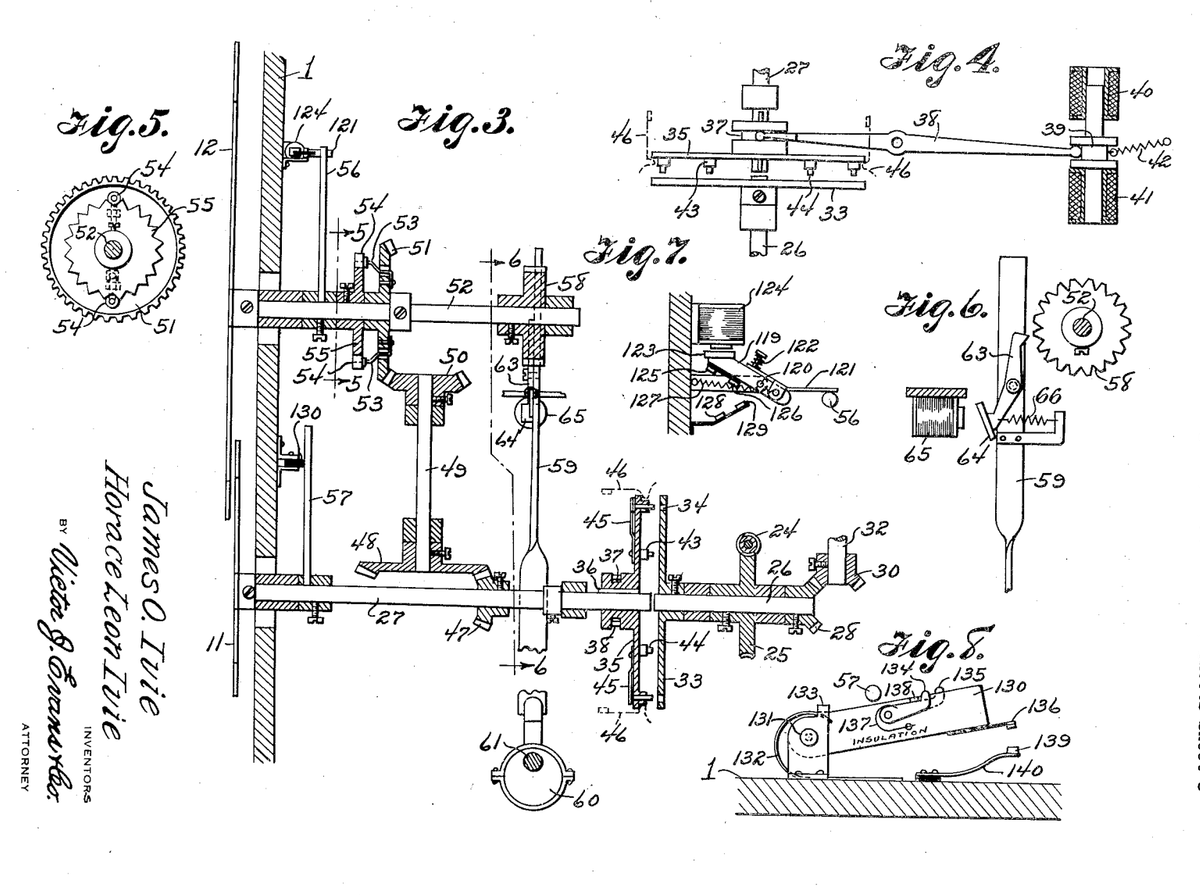
Figures 3 and 4 are views, partly in elevation and partly in section, of portions of the time mechanism.
Figure 5 is a detail section on the line 5—5 of Figure 3.
Figure 6 is a section on the line 6—6 of Figure 3.
Figures 7 and 8 are detail views of switches which form parts of the operating mechanism.

Referring now to Figures 2 and 3, power for operating the team total score dials is applied only to the unit dial 19 which has a single projection or lug 20 at or on its periphery which is adapted at the end of each revolution to engage a pair of projections 21 on the tens dial 19' and thereby move the latter through one-tenth of a revolution.

The power for driving the time mechanisms is preferably furnished by a synchronous electric motor, indicated conventionally at 22, while the power for operating the drums and dials or disks is derived from an induction motor, indicated conventionally at 23. The shaft of the motor 22 carries a worm 24 (Fig. 3), which meshes with a worm gear 25 secured on a shaft 26 which is suitably mounted on some fixed member of the supporting frame and is alined axially with a shaft 27 which extends through the board or front wall 1 and carries the hand 11 at its front end. A bevel gear 28 is secured on the rear end of the shaft 26 and meshes with bevel gears 29, 30 on the ends of shafts 31, 32, respectively, said shafts extending to the mechanism for turning the hands 16 and 15 respectively.

The "minutes to play" device is operated through the following mechanical elements. On the front end of the shaft 26 is secured a clutch disk 33 having openings 34 close to its periphery and throughout its annular extent. A mating clutch disk 35 is splined upon the inner end of the shaft 27, as shown at 36, so that it may slide upon the shaft but is constrained to rotate therewith, and the hub of this disk 35 is provided with an annular groove 37 in which is engaged the forked end of a lever 38 (Figure 4) which is fulcrumed between its ends and has its opposite end engaged with a slide 39. The ends of the slide 39 constitute cores for the respective solenoids 40, 41 which are not simultaneously energized and serve to rock the lever 38 so as to shift the disk 35 into or out of engagement with the disk 33 accordingly as the hands 11 and 12 are to turn or not to turn, it being understood that the shaft 26 rotates constantly and the shaft 27 rotates only when the clutch disks are engaged. A compression spring 42 holds the slide in the position in which it is set.

The disk 35 has six bosses 43 on its face presented to the disk 33 and pins 44 are slidably mounted in these bosses and are adapted to engage the openings 34 so that the two disks will rotate together and effect rotation of the shaft 27. The holes 34 and pins 44 are relatively staggered so that only one pin will engage an opening in one-sixth of a second when the movable disk is shifted and firm coupling of the disks will be effected. If two holes passed a pin in one second, engagement would be effected in one-twelfth of a second. Of course, the details may be varied according to demands. The pins 44 are carried by springs 45 secured on the disk 35 so that the pins which strike the disk 33 may yield to the impact and thereby avoid breakage. Shouldered spring detents 46 are secured in any convenient manner adjacent the disk 35 to engage the periphery of the disk and yieldably hold it in either of its positions thereby guarding against accidental shifting of the disk and possible breakage of the parts.

Secured on the shaft 27 is a beveled pinion 47 which meshes with a beveled gear 48 on the lower end of a vertical shaft 49 journaled in bearings conveniently located on the frame of the apparatus, a beveled gear 50 being secured on the upper end of the shaft and meshing with a beveled gear 51 loose on the shaft 52 which carries the hand 12. The gear 51 has secured thereto two stiff springs 53 projecting laterally and having rollers 54 on their free ends which bear upon the notched periphery of a disk or gear 55 which is secured on the shaft 52, the pressure of the springs on the rollers holding the rollers on the disk so that the rotation of the gear 51 will be transmitted to the disk and to the shaft 52. It may be noted at this point that the disk 55 has the same number of teeth as there are minutes in a playing period.

56 designates a circuit-closing finger secured on the shaft 52 and 57 designates a similar finger secured on the shaft 27. The operation of these fingers and the train of gearing and shafts associated therewith will appear later.

The "minutes to play" device, described above, may be moved back from any particular time indication in any playing period when necessity arises by the operation of the following elements. A ratchet gear 58 (Figure 6) is secured on the shaft 52 near the rear end thereof and a reciprocatory bar 59 is arranged near said gear, said bar being actuated by an eccentric 60 on the shaft 61 which extends from end to end of the casing and is driven by the motor 23 through gearing indicated at 62 in Figure 2. Pivoted between its ends on the bar 59 is a dog 63 which has its upper end disposed toward the ratchet gear and adapted to engage the same, while its opposite end is at the opposite side of the bar and is equipped with a pole piece 64 which serves as an armature for an electromagnet 65, a spring 66 acting on the dog 63 in opposition to the magnet in an obvious manner. Normally the dog is clear of the gear, as shown in Figure 6, but when the magnet is energized the dog will be thrown into position to engage the ratchet gear and will turn the gear one tooth on each up stroke of the bar. The turning of the gear causes the shaft 52 and the disk 55 to turn, but the gear 51 cannot turn because of the resistance from the train of gearing cooperating therewith, the result being that the rollers 54 will be engaged in the next adjacent notches in the disk and the hand 12 will be moved back one minute. The finger 57 controls the mechanism which prevents current going into the magnet except in one particular position.

Figures 9, 10, 11, 12, 13:
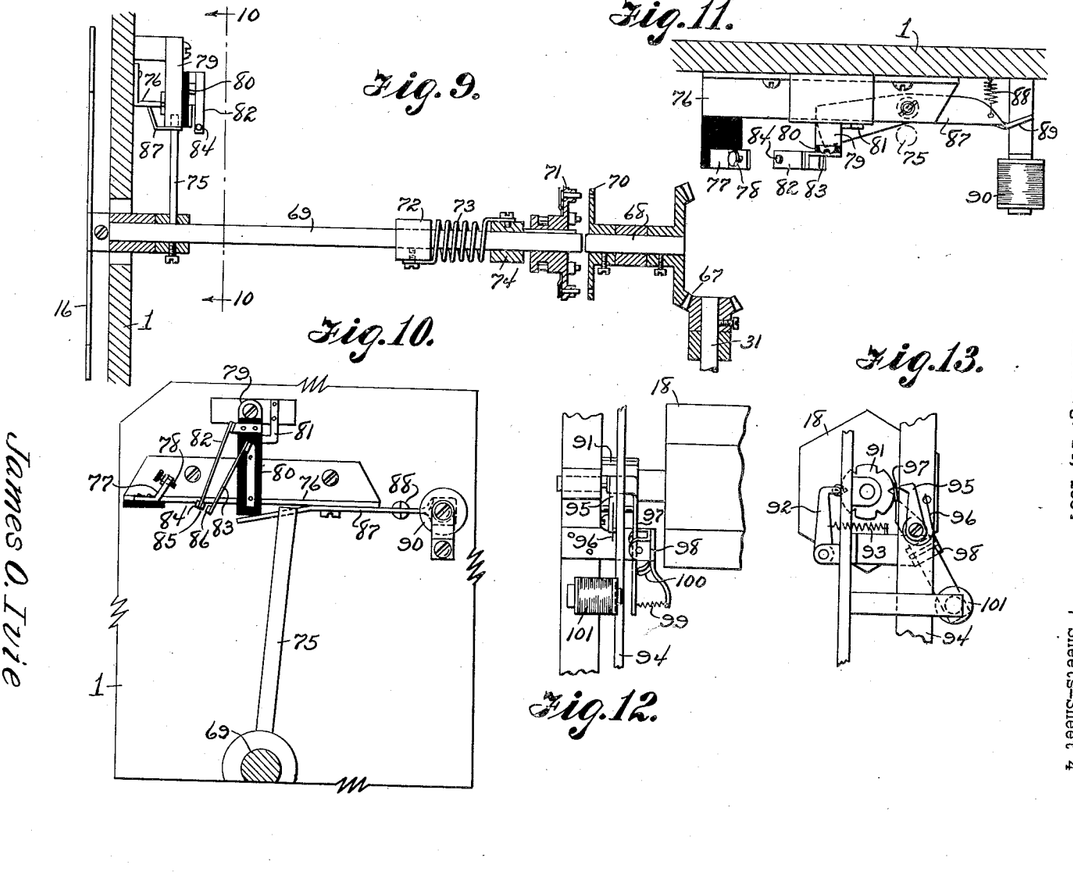
Figure 9 is a section through part of the mechanism for timing certain intervals.
Figure 10 is a section on the line 10—10 of Figure 9.
Figure 11 is a plan view of the mechanism shown in Figure 10.
Figure 12 is a side view of the drum operating mechanism.
Figure 13 is an end elevation of a drum and the means for operating it.

The "off goal" and "time out" devices used in this score board are shown, in general, in Figure 2 and in detail in Figures 9, 10 and 12. The shafts 31 and 32 are respectively connected at their upper ends, through bevel gearing as shown at 67, with the mechanism for turning the "off goal" and "time out" hands. Referring to Figure 9, 68 designates a shaft which is geared to the shaft 31, or the shaft 32, and rotates constantly. The shaft 68 is alined axially with the hand-carrying shaft 69 by clutch members 70, 71, corresponding to the clutch members 34, 35. A collar 72 is secured on the shaft 69 and a coiled torsion spring 73 is attached to said collar and to a stationary member 74 of the frame so that it will return the shaft to initial position when the clutch is opened. The shaft 69 makes one complete revolution and then stops automatically, and the hand then sets off an electric signal which will continue to operate until a reset contact is made in the circuit whereupon the spring 73 will return the shaft to the starting point. If the clutch is opened before the hand reaches the signaling point, the hand merely returns to the starting point. The finger 75 on the shaft stops the hand at the starting point and also operates the signal mechanism.

Above the shaft 69, a bracket or shelf 76 is secured on the front wall or board and mounted at one end of this shelf and insulated therefrom is a small frame or plate 77 in which is mounted a contact screw 78 electrically connected with one side of the signal. Pivoted at its upper end above the shelf 76 is a block 79 having insulation 80 upon its rear side and having its lower end in the path of the end of the finger 75, a stop 81 being provided to limit the movement of the block in a direction away from the contact point 78. Mounted on the insulation 80 (Fig. 10) are leaf springs 82 and 83, the spring 82 having the double contact points 84 and 85 at its free end and the spring 83 having a single contact point 86 at its free end. Electric conductors are attached to the elements 77, 82 and 83 to connect them into the proper circuits. When the block 79 swings toward the plate 77, the contact 84 is brought against the contact 78 and a slight further movement of the block will cause the spring 82 to bend until the contacts 85 and 86 meet. These elements thus form a mechanical stop for the block and they also close electric circuits as will presently more fully appear.

Pivotally mounted on the under side of the shelf 76 is a vibratory plate or dog 87 which is normally so held by a spring 88 that a portion of its edge at the end remote from the spring projects beyond the shelf into the path of the finger 75 as shown in Figure 11. At the end to which the spring 88 is attached, the dog is provided with a pole piece 89 which constitutes an armature for an electromagnet 90 which, when energized acts in opposition to the spring. The finger 75 moves to the left in Figures 10 and 11 and, in Figure 11, the dotted circle indicates the position of the finger just as it engages the edge of the dog. The continued movement of the finger will press the end of the dog back under the shelf and the finger then impinges against the block 79, the dog returning to normal position back of the finger. The finger pushes the block a slight additional distance whereupon the power driving the finger is released and the finger falls back against the end of the dog, the contacts 85 and 86 being separated but the contacts 78 and 84 remaining in engagement. The parts will remain in this position with the signal going until the magnet 90 is energized. Energization of the magnet will cause the dog to release the finger which will then swing back to the initial position against the opposite side of the block 79, the impact moving the block so that the contacts 78 and 84 will be separated and the signal will be stopped.

The drum indicators of the apparatus for showing the period of play, the drums carrying the players' names, and the drums indicating the fouls against each player are operated in the following manner. The shaft 61 (Figure 2) has a plurality of eccentrics 60 mounted thereon and each reciprocates a bar 94 which sets a drum or a counting disk. Referring particularly to Figures 12 and 13, it will be seen that a notched disk or ratchet 91 is fixed on the axle of each drum, the notches in the edge of the disk corresponding in number and location to the sides of the drum, and a detent 92 is held to the ratchet by a spring 93 so that the drum will be yieldingly held in a set position. The reciprocatory bar 94 carries a pivoted dog 95 which is pressed toward the ratchet by a spring 96 and, if unrestrained, would turn the ratchet the distance between one notch and the next on each upstroke of the bar. Normally, however, the dog is held out of engagement with the ratchet by a guard finger 97 which covers the notch that would be engaged by the working dog. The guard finger is pivoted between its ends in a small bracket 98, on a fixed part of the framework, and its working end is held to the ratchet by a spring 99, a lug 100 on the bracket limiting the movement under the influence of the spring. The end of the guard finger remote from the ratchet serves as an armature for an electromagnet 101 which, when energized, attracts the finger and rocks it so that the notch in the ratchet is uncovered and the dog may then engage and turn the ratchet. It is to be understood that the bar carries as many dogs as there are drums 18 but no drum will be turned unless the associated guard is swung to inoperative position, and the operator by selectively energizing the magnets 101 may effect turning of the desired drums. The drums which display the playing period legends through the slots 17 are operated in the same manner as the other drums except that the ratchets are not secured directly on the axles but are connected therewith by gymbal joints, as shown at 102 (Figure 2).

Figure 14:
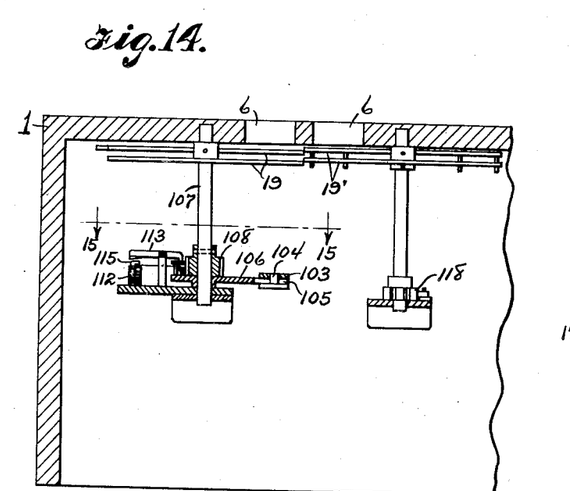
Figure 14 is a view, partly in plan and partly in section, on the line 14—14 of Figure 2, of the disk-operating mechanism.

The disks 19 for indicating the points scored by each player and those for indicating the total points scored by each team are operated through the mechanism shown in Figures 14, 15 and 16 as follows: The bars 103, which are the prime movers for the counting dials, carry a plurality of studs 104 arranged adjacent the respective dials and each is engaged in a notch or slot 105 in the end of a lever 106 mounted loosely on the axle 107 of the associated unit disk. Immediately adjacent the lever, a ratchet or notched disk 108 is secured on the axle 107 and a spring-pressed detent 109 engages said ratchet to yieldably hold it in a set position. Pivoted upon the lever, at the end remote from the slot 105, are dogs 110 which are pressed toward the ratchet by springs 111 and are adapted to engage and rotate the ratchet in opposite directions. Mounted in any convenient manner adjacent the dogs 110 are electromagnets 112, the armatures for which are provided on the adjacent ends of rocking arms 113 which have their opposite ends normally projecting into the paths of the respective dogs 110 and holding the dogs in inoperative position. When either magnet is energized, its armature will be attracted and the corresponding dog will be freed to engage and drive the ratchet. The armatures are yieldably held away from the magnets and to the dogs by springs 114, as shown in Figure 16. A latch 115 is disposed between the magnets and is connected by a link 116 with the detent 109. When either magnet is energized, its armature is drawn down so that a lug 117 thereon is caught by the latch, the detent 109 and the armature being thus held until the dog has moved the ratchet one step. By this arrangement, a brief touch on the control button 180 is certain to cause the proper movement of the ratchet and counting disk regardless of the position of the moving shaft when the button is touched.

A detent, indicated conventionally at 118, prevents back motion of the tens dial.

Going back to the mechanism for operating the pointers 11 and 12 for indicating the "minutes to play", Figures 7 and 8 show details of switches which are employed in the time mechanism. Figure 7 shows a relay which is opened electrically and is closed by the finger 56. A frame or plate 119 is pivoted at 120 upon the main frame and pivoted upon said frame or plate at one end thereof is a bent lever 121 having one arm extending into the path of the finger 56 and its other arm normally resting against the plate 119 under the influence of a spring 122. The end of the plate 119 beyond the lever 121 carries a pole piece 123 which is an armature for a magnet 124 and on the opposite side of plate 119 are two contact points 125 and 126 which are insulated from the plate and from each other. A spring 127 yieldably holds the plate 119 in either position in which it may be set. 128 and 129 designate contact points which are engaged by the points 125 and 126 respectively in one position of the plate 119. When the finger 56 moves upwardly in Figure 7 (which is the direction of its travel when the clock is in gear, Fig. 7 being a bottom view) it abuts the lever 121 and rocks the lever and the plate 119 so as to swing the points 125 and 126 against the points 128 and 129, and the finger 56 may then clear the lever. If the "minutes to play" hand is being set back, as for an extra period, the finger 56 will impinge upon the upper side of the lever 121 which will rock upon its pivot and permit the finger to pass without changing the position of the plate 119.

Referring to Figure 8, a plate or bar 130 of insulation is pivoted at one end, as at 131, and a spring 132 yieldably holds it in the position shown, the upward movement being limited by a stop lug 133. At or near its free end, the bar 130 is provided with three contacts 134, 135 and 136, the contact 136 being shown as spring mounted on the under edge of the bar and the contacts 134 and 135 being pivoted on the opposite sides of the bar and yieldably held up by springs 137, the upward movement being limited by stop lugs indicated at 138. The contacts 134 and 135 make electrical contact with the finger 57 every time it passes, said finger being connected into the grounded side of the power circuit, and the pressure of the finger riding over the bar 130 forces the contact 136 against the contact 139 carried by a leaf spring 140.

On top of the main frame or casing (Figures 1 and 2), at the top thereof, is a relatively small housing 141 to which access may be had through the back and in which a gun for announcing the close of a playing period is mounted. The gun comprises posts or side bars 142 (Figures 20, 21 and 22) connected at their upper ends by cross beams 143, 144, all of these elements preferably being of metal. The beam 143 is drilled to provide blank-cartridge openings or barrels 145 arranged in pairs and through the beam 144 are drilled openings alined with the barrels 145 to receive and guide the firing pins 146. By firing two shells at once, an explosion is made certain as one shell may be defective but the probability of both shells failing is practically nil. Below the beam 144 and spaced therefrom, a beam 147 extends between and is secured to the posts 142, and this beam has vertical passages formed through it to receive the hammers 148 having heads 149 at their upper ends arranged below and adapted to impinge upon the lower ends of a pair of firing pins and drive the latter against the shells to explode the same. The hammers are forced upward by strong expansion springs 150 coiled around them between their heads and the beam 147, and they are held down against the action of the springs by triggers 151 mounted in the beam 147 and arranged to engage notches 152 formed in the respective hammers, as shown clearly in Figure 22. The triggers are held to the hammers by leaf springs 153 secured on the beam 147 and bearing upon the outer downturned terminals of the triggers which pass through slots 154 in a guide plate 155, and, to insure the notches 152 being in position to be engaged by the triggers, guide pins 156 are carried by the lower ends of the hammers and play in vertical slots 157 in a guide plate 158 whereby turning of the hammers is prevented. A firing shaft 159 is journaled in the posts 142 and extends across the rear sides of the pendent ends of the triggers, cams 160 being arranged helically along the shaft so that as the shaft rotates the cams will be brought successively against the triggers which will, consequently, be successively released from the hammers and the pairs of shells successively fired. Secured on one end of the shaft is a notched disk 161 and loosely mounted on the shaft alongside the disk is a lever 162 upon which is hung a dog 163 adapted to engage and actuate the disk. A spring 164 holds the lever and dog yieldably in the position shown in Figure 21 and a solenoid 165 is arranged to act upon the lever in opposition to said spring, a link 166 extending from the solenoid core 167 and having its free end engaged in a slot 168 in the upper end of the lever. When the solenoid is energized, a pull is exerted upon the lever which effects a partial rotation of the shaft and fires the gun. When the solenoid is deenergized, the spring retracts the lever and resets the mechanism for the next firing action.

Figures 19, 21, 22:
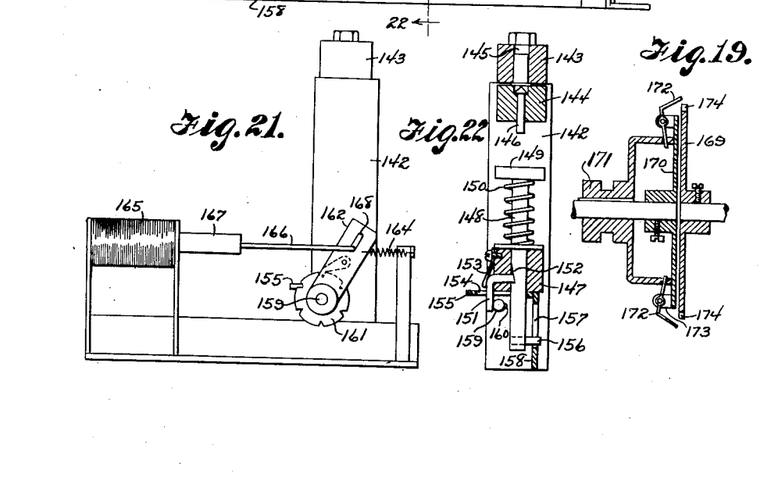
Figure 19 is a sectional view of a modified clutch.
Figure 21 is an end elevation of the gun.
Figure 22 is a section on the line 22—22 of Figure 20.
Figure 20:
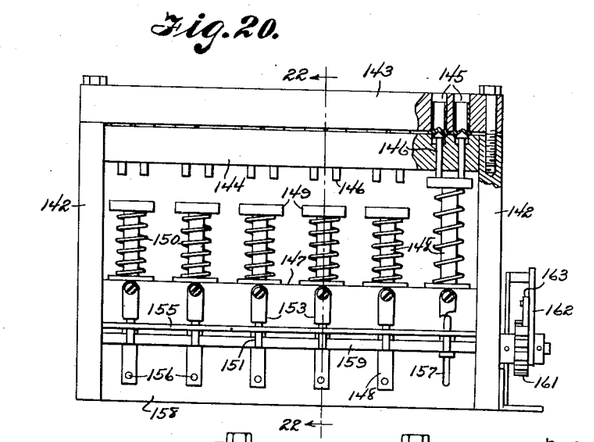
Figure 20 is an elevation, with a part in section, of the gun.

In Figure 19 is shown a clutch which may be substituted for the clutch previously described. In this clutch, the disks 169 and 170 are fixed upon their respective shafts and remain at a constant distance apart. A drum 171 is slidably mounted at the side of the disk 170 and is provided in its side with openings in which are engaged the inner ends of angle levers 172 which are fulcrumed on lugs 173 on the disk 170 and have their outer ends arranged to engage notches 174 in the edge of the disk 169 to thereby lock the disks together. The drum is shifted by the energization of opposed solenoids as heretofore described.

Figure 1:
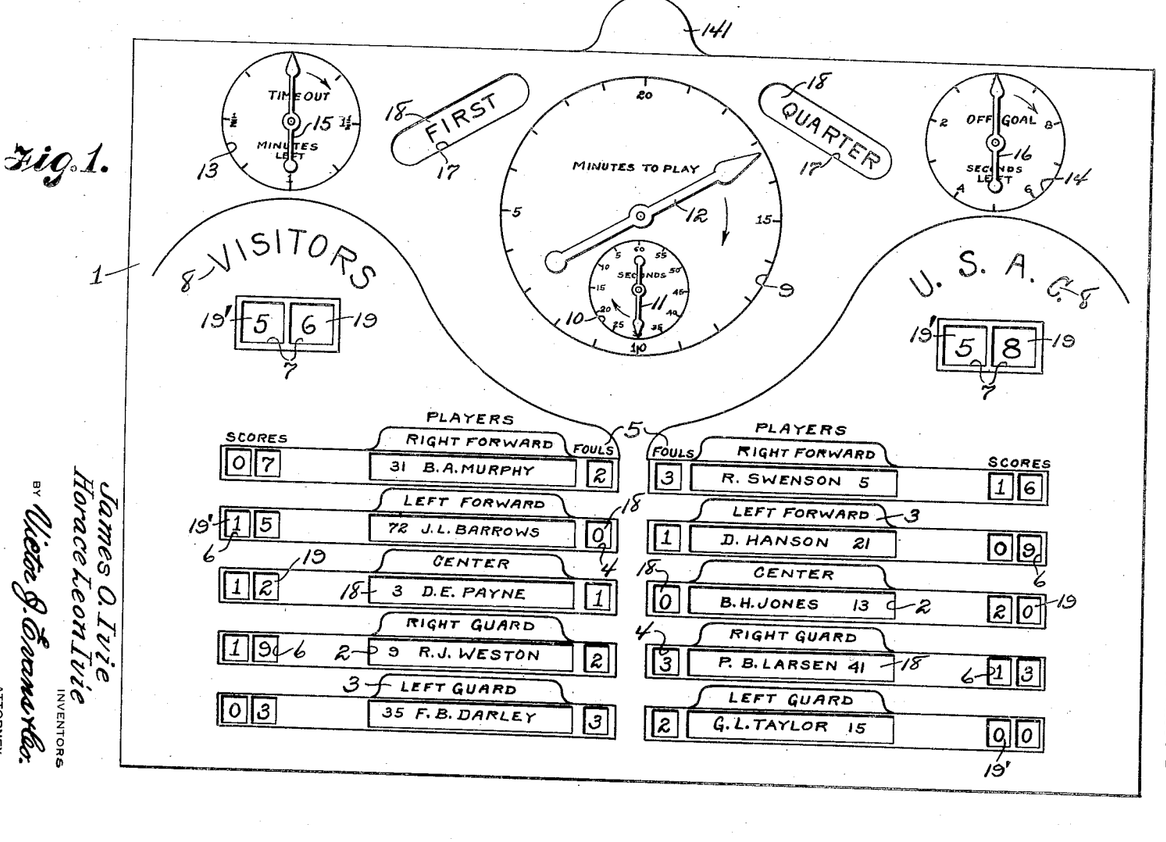
Figure 1 is a front elevation of an apparatus embodying the invention.
Figure 17:
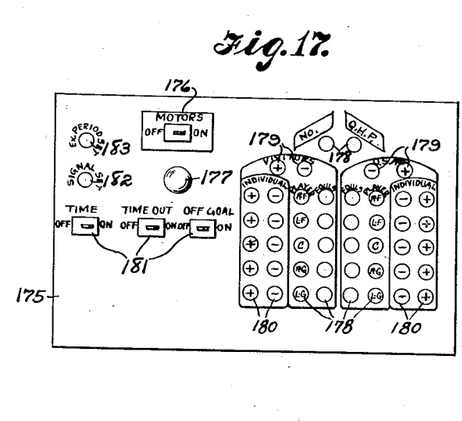
Figure 17 is a plan view of the control board.

The score board shown in Figure 1 is operated from a remote control board or table 175 shown in Figure 17, under the direction of an official. A cable of wires connects the table with the score board and by depressing any one of the various buttons mounted on the table, a particular electrical operating circuit is completed and may be traced on Figure 18. The switch 176 on the table is a master key switch which controls the passage of the necessary current through the motors and electrical switches mounted on the score board. The pilot light 177 indicates when the current is on for operation of the score board indicators.

The top drum 18 on the left side in Fig. 1 has the legends "First", "Second", "Third", and "Fourth", printed on its sides, while the top drum on the right side bears the legends "Half", "Quarter" and "Ex. Period". A high school game is played in quarters and, therefore, the top drums 18 should read "First quarter", "Second quarter", "Third quarter", or "Fourth quarter." A college game is played in halves and in this case, the drums 18 would read "First half" or "Second half." If a game should end in a tie, the legends of the drums 18 can be moved to read "First extra period", "Second extra period", "Third extra period", or "Fourth extra period."

The buttons 178 when depressed will close the electrical circuit through the previously described mechanism which will rotate the drums 18 to bring the proper legends therein in position to be seen through the openings 17 in Figure 1, and designate the playing period of a game. Assuming that it is desired to make the legends of the top drums 18 read "First extra period", the button 178 under the legend "No." in Fig. 17 is depresed to cause current to flow through the electromagnet 101 (Fig. 12). This magnet then pulls the end of finger 97 against the magnet, and in so doing, removes the guard end of the finger away from the ratchet gear 91, thereby permitting the dog 95 on the reciprocating shaft 94 to drop into one of the notches of the gear 91 and turn the drum 18. The drum is permitted to turn until the reading "First" appears through the slot 17. The button 178 then is released to discontinue the flow of current through the magnet 101, and thereby permit the spring 99 to return the finger 97 to its normal position where it prevents the dog 95 from dropping into the notches of gear 91. The drum 18 then stops turning. Button 178, on the right, under the legend "Q—H—P", controls the flow of current through the magnet 101 for operating the drum 18 bearing the legends to indicate the periods. This button is released to discontinue the flow of current through the magnet 101 when the reading "Extra period" turns into view through the slot 17. The same procedure follows for any of the other readings that are desired for designating the various playing periods.

The same mechanisms shown in Figs. 12 and 13, and mentioned above relative to the playing periods, are also used in making the proper changes for the names of the players appearing through the openings 2, Fig. 1, and the personal fouls called on the players and shown through the openings 4. In Figure 17, the buttons 178, on the table 175, under the legends "Players" and "Fouls" control the flow of current through their respective magnets 101. If, for example, the center of the visitors' team commits a foul, the third button down the "foul" column opposite the button labeled "C" in the "players" column of the visitors' side is depressed. That causes current from the battery 184 to flow through the magnet 101, and causes the particular foul drum to turn. The turning of the foul drum may be stopped by releasing the pressure on the button as soon as the proper number has been turned into view. The intermediate mechanical movements which take place during the operation just described have already been explained in the operation of the playing period mechanism. If a substitution is made for the right forward of the "U. S. A. C." or home team, the button 178 labeled "RF" on the "U. S. A. C." side is depressed to cause the current to flow from the battery 184 through the proper magnet 101 and turn the "right forward" drum 18 on the "U. S. A. C." side of the score board. When the proper name appears behind the opening 2, the button is released to discontinue the flow of current through the magnet 101, and consequently, to discontinue the turning of the "right forward" drum above mentioned.

The total scores of the teams are indicated through the openings 7 by means of the disks 19 and 19' (Fig. 2). The buttons 179 (Fig. 17) control this indication; the plus button adding the score and the minus buttons subtracting from the score in case a correction should be necessary. If, for example, the visitors make a basket, the plus button 179 of the visitors' side of the table is given a brief push. This sends an impulse of current from the battery 184 through the advancing magnet 112 as shown in Figures 15 and 16. The magnetism, while the current impulse lasts, pulls the end of the finger 113 against the magnet. During that movement, a projection 117 on finger 113 passes under the point of the catch 115 which hooks the projection 117 and holds the finger 113 against the magnet. With the finger 113 in that position, it will not prevent the dog 110 on the rocking lever 106 from dropping into a notch of the gear 108. When that occurs, the dog 110 causes the gear to rotate in one direction with the shaft 107. As soon as the gear 108 moves, the roller on member 109 is pushed out of a notch of the gear and in so doing, moves the catch 115 by means of the small rod 116. The moving of catch 115 allows the finger 113 to swing back into its normal position under the action of spring 114 and the dog 110 is prevented from catching in another notch of the gear. As the gear 108 has advanced one notch, it has turned the disk 19 enough to advance the reading of the score by one number. The two points made by the making of a basket can be indicated by two depressions of the button a few seconds apart. If, by any chance, the particular basket should be disqualified after it has once been added to the team score, the minus button 179 is depressed to cause current to flow through the opposite magnet 112. By means of the same mechanical action as has been described, the gear 108 will turn one notch in the reverse direction and thereby correct the reading of the score.

Figure 15:
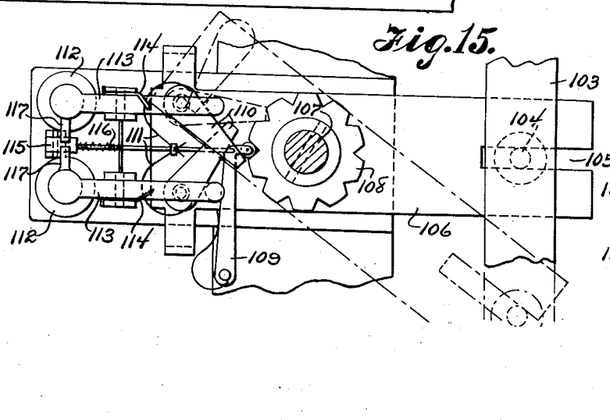
Figure 15 is a section on the line 15—15 of Figure 14.
Figure 16:
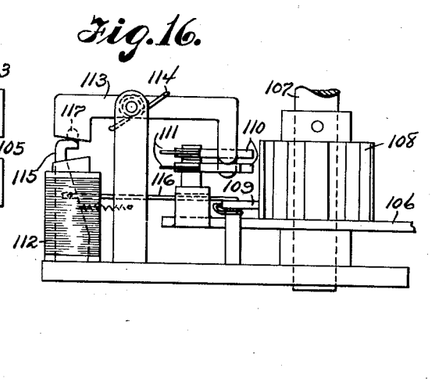
Figure 16 is a plan view of the mechanism shown in Figure 15.

The same type of mechanisms shown in Figures 15 and 16 and mentioned above relative to the team score, is used for displaying the individual scores of the players through the openings 6. In this case, the plus and minus buttons 180 under the legend "Individual" of Figure 17, are depressed to cause the same action as has just been described for the team score. If, for example, the center makes a basket, the plus button 180 on the "C" row of the respective team side is depressed to cause current from the battery 184 to flow through magnet 112, and thereby cause the adding of the appropriate score to the indicator for the particular center. Again, the minus buttons 180, beside the above mentioned player's plus button, when depressed, will cause his score to be reduced.

Figure 18:
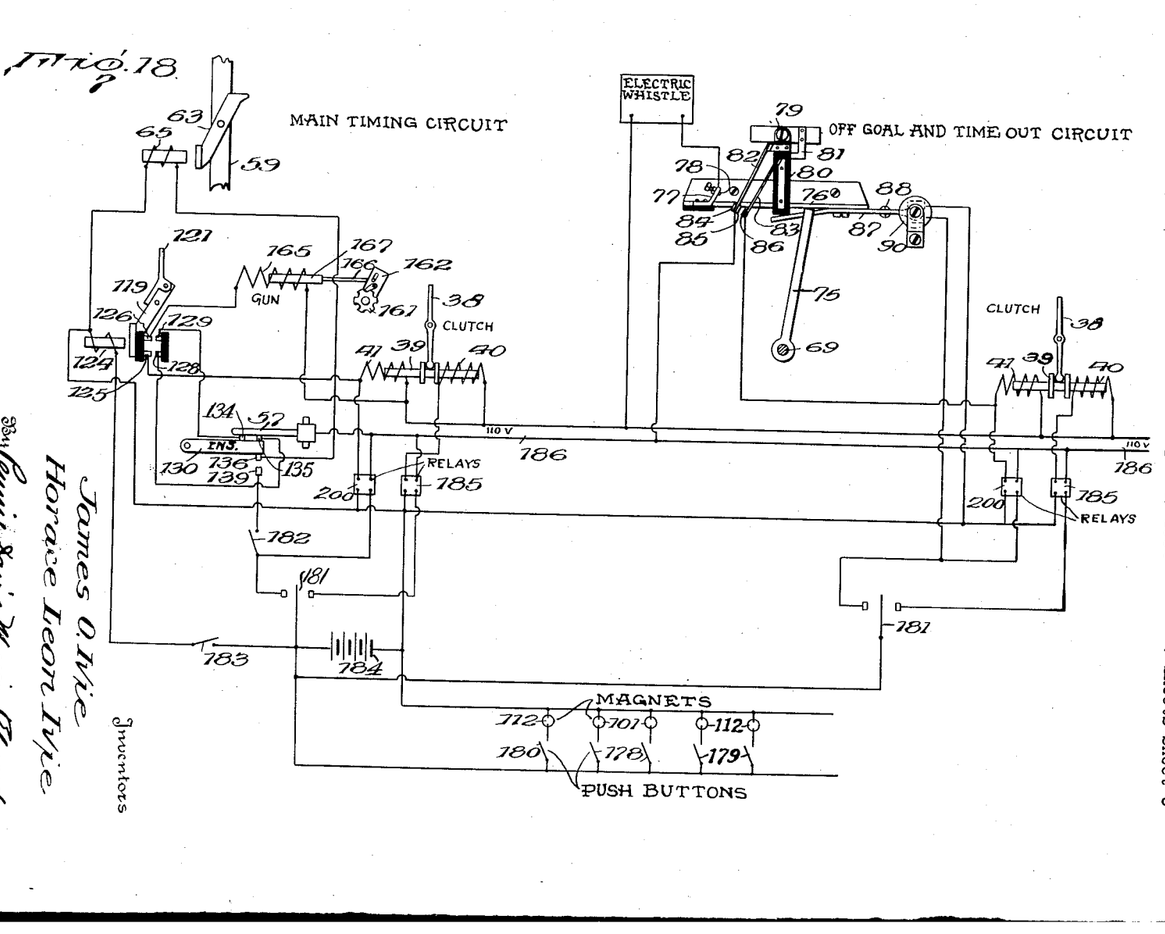
Figure 18 is a diagram of the electrical wiring.

The switches 181 are double-throw switches as indicated diagrammatically in Figure 18. We will assume that one team gets the ball in its back court and, therefore, has ten seconds, under the present rules, to get the ball into front territory. The operator presses the "off goal" switch 181 to the right in Figure 17 or Figure 18 thereby closing a circuit which sends current from the battery 184 into the relay 185 which thereupon closes contacts which send current from the power trunk lines 186 into the solenoid, as at 40, and the "off goal" clock 14 (Figure 1) will be put in gear. The switch may then be released and will spring back to neutral position cutting off the flow to the relay and solenoid but the clock will remain in gear. With the clock 14 in gear, the finger 75 (Figures 9 or 18) and the hand 16 will rotate at the rate of one revolution in ten seconds. If the team runs over the ten seconds, the finger 75 will have impinged against the block 79 and assumed a position between the block and the end of the rocking plate 87 and the contacts 78 and 84 will have been brought together and have closed the circuit to the signal, which may be an electric whistle. The finger 75, however, is still moving and the block 79 is pushed slightly farther closing a circuit through the contacts 85 and 86 which sends current into the solenoid 41 and opens the clutch. The contacts 84, 85 and 86 being carried by light springs, the finger 75 may continue to move until a slight magnetic lag in the solenoid 41 is overcome so that freezing pressure on the engaged pin of the clutch will be prevented. As soon as the clutch is opened, the finger 75 falls back against the end of the plate 87 with the pressure of the return spring but the signal is still going although current has stopped flowing to the solenoid 41 and the clock is out of gear. The operator may stop the signal and reset the clock by momentarily moving the switch 181 to the left which sends current into the magnet 90 and the solenoid 41 but, as the clock is out of gear, the energization of the solenoid is without effect. The magnet 90, however, will release the plate 87 from the finger 75 which will be rotated by the return spring 73 back to the starting point. If the team does not overrun its time, the operator may stop and reset the clock at any time by merely briefly pushing the switch 181 to the left and, as the clock is now in gear, the solenoid will act to put it out of gear, allowing the finger and hand to return to initial position.

The "time out" indicator is a repetition of the "off goal" indicator description given above. The only difference in the two is that the finger 75 of the "off goal" clock swings around once in 10 seconds while the finger 75 of the "time out" clock swings around once in two minutes.

The operation of the "minutes to play" indicator is controlled by switch 181 shown in Figure 17 and bearing the label "Time." Assuming that the clock is stopped and the teams are ready to start a playing period, the switch 181 is pushed to the right to cause current from the battery 184 to flow through the relay 185, which then causes current from the power line 186 to flow through solenoid 40 and pull the plunger 39 inward. The movement of the plunger 39 into the solenoid 40 causes the lever 38 to rotate so that the clutch 35 is in gear. When the clutch is in gear, the shaft 26 turns the shaft 27 (Figure 3), which, in turn, rotates the "second" indicating hand 11. The gearing from the shaft 27 turns the hand 12 to indicate the minutes to play. When the pressure is taken off switch 181, it assumes a neutral position between its two contact positions, so that no current is flowing from the battery 184 through either of the relays 185 or 200. The flow of current through the solenoid 40 then ceases, but the clock stays in gear because it requires power to move it out of gear. In such a condition, the clock keeps turning until the time keeper stops it by giving the switch 181 a push to the left. When the switch is moved to the left, current from the battery 184 flows through relay 200, which then causes current from the supply line 186 to flow through solenoid 41. Plunger 39 is then pulled to the left or into the solenoid 41, with the result that the clock is mechanically thrown out of gear. When the pressure holding the switch 181 to the left is relieved, it again assumes a neutral position and interrupts the flow of current in the circuit. The clock can be thrown in and out of gear any number of times during the playing period, and the indicators will continue on towards the close of the period from each stopping point.

Switches 119 and 130, shown in Figures 7 and 8 and indicated diagrammatically in Figure 18, control the automatic stopping of the clock and the firing of the gun at the end of a playing period. At the start, the switch 119 is open and the finger 56 (Figure 7) is on the upper side of the lever 121 and in position to move away from the projection as the clock runs, but within 20 minutes it will return to the under side of lever 121 moving in an upward direction such that it can swing the switch on its pivot 120 and cause the contacts of the switch to close within the last minute of the playing period. Finger 57, which makes contact with the grounded side of the supply line 186, passes from the left to the right over the top of switch 130 once every minute. At the point where the finger 57 touches the contacts 134 and 135, it pushes the switch downward until contacts 136 and 139 are touching. The contact between the finger 57 and points 134 and 135 has no effect unless the switch 119 is closed. Assuming that the clock is running near the end of a game, the finger 57 passes over the switch bar 130 and starts to measure the last minute, while the finger 56 impinges against the under side of the lever 121, and up to this point all the contacts of both switches are in an open position. The finger 56 then rocks the switch bar 119 so that the contacts 125, 126, 128 and 129 are closed, thus preparing the circuits for current flow at the close of the last second of the period. At the end of the last second, the finger 57 returns and bridges the contacts 134 and 135 of the switch 130, and current from the supply line 186 then flows from the contact 134 to the points 129 and 126, which are touching, and then through solenoid 165 which will pull the plunger 167 and fire the gun. Current also flows from the contact 135 to the points 128 and 125 and through solenoid 41 which stops the clock. Current will continue to flow in the solenoids at this point as long as switch 119 remains closed, as switch 181 has no effect in the operation of the clock when switch 119 is closed. It can send current into solenoid 40 but that solenoid cannot pull the plunger 38 because current is still flowing in solenoid 41. That, in a sense, locks the clock in the position at which it was at the end of the period until it is desired to start timing the next playing period.

Assuming that it is desired to put things in order for timing the next playing period, the operator depresses the button 183 to cause current from the battery 184 to flow through magnet 124 which will pull the switch 119 open, so that the contacts 126, 129, 125 and 128 will no longer touch. That interrupts the flow of current through solenoid 165 and allows the spring 164 (Fig. 21) to pull the plunger 167 back into its original position, where it is again ready to fire the next shot at the end of the next playing period. Current also stops flowing through the solenoid 41 which again makes it possible for the switch 181 to start and stop the clock.

If the next playing period should be an extra five minute period, as for a tie game, it will be desired to set the indicator to read 5 minutes to play before the period is started. The clock has been stopped in such a position that the finger 57 is holding the contacts 136 and 139 together, and at that point gear 58 (Fig. 6) is in the proper position for dog 63 on reciprocating shaft 59 to engage the notches of the gear. To set the clock, the operator pushes the switch 131 to the left, then depresses the button 182 to cause current from the battery 184 to flow through the contacts 136 and 139 to magnet 65 and cause the dog to swing into a position in which it will catch and move the gear one notch backwards for each stroke of the shaft 59. Five strokes of the shaft will shift the minutes-to-play indicator to that position where it will indicate "five minutes to play". The official then releases the pressure on the button 182 to interrupt the flow of current and allow dog 63 to assume its normal position. By that method, the time indicator can be set for any playing interval desired within the range of 20 minutes.

It will thus be seen that a score board is provided which is operable through the medium of a remote control board and is capable of indicating at any time during the course of a game, a true résumé of any and all pertinent facts relative to the period being played, namely, players, players' scores, players' fouls, team scores, time to play, time out and/or off-goal time.

Having described the invention, we claim:

1. A time indicating mechanism comprising a dial, an indicator movable over said dial, operating means for said indicator including a driving shaft and a driven shaft, time-controlled means for rotating said driving shaft, and gearing connecting the driving shaft and the driven shaft including a gear loosely mounted on the driven shaft, a notched disk secured on the driven shaft adjacent the loosely mounted gear, the number of notches on said notched disk corresponding to the divisions on the dial, fingers secured on the loosely mounted gear and yieldably engageable in the notches of the disk, and a resetting mechanism for said indicator.

2. A time indicating mechanism comprising dials, indicators movable over said dials, operating means for said indicators including driving means comprising two longitudinally aligned shafts, and a driven shaft, means for rotating said driven shaft comprising said longitudinally aligned shafts, time-controlled means for constantly rotating one of the aligned shafts, the other aligned shaft carrying one of the indicators, cooperating clutch members mounted on the aligned shafts, one of said clutch members having on the face presented to the other clutch member a plurality of resiliently mounted projections adapted to engage openings in the face presented thereto by the other clutch member, means for engaging and disengaging the clutch members, the projections and the openings being relatively staggered to reduce the maximum angular motion lost when a coupling of the clutch members is effected, and gearing connecting the driving means to the driven shaft.

3. A time indicating mechanism for a game comprising a dial, an indicator movable over said dial, time-controlled means for operating said indicator including a shaft, a remotely-controlled clutch means for rotating said shaft in one direction, and remotely controlled means for rotating the shaft in the opposite direction for resetting said indicator.

4. A time indicating mechanism for a game comprising a dial, an indicator movable over said dial, time-controlled operating means for said indicator including a shaft, remotely controlled clutch means for rotating said shaft in one direction, and means for rotating the shaft in the opposite direction for resetting the time indicator, comprising a ratchet secured on the shaft, a reciprocatory bar, and a dog mounted on the bar and adapted to engage the ratchet positively when the bar travels in one direction of its reciprocating cycle.

5. A time indicating mechanism for a game comprising a dial, an indicator movable over said dial, time-controlled operating means for said indicator including a shaft, remotely controlled clutch means for rotating said shaft in one direction, and means for rotating the shaft in the opposite direction for resetting the time indicator, comprising a ratchet secured on the shaft, a reciprocatory bar, a dog mounted on the bar, means for yieldably holding the dog from engagement with the ratchet, and remote-control means for engaging the dog with the ratchet, said dog being adapted to engage the ratchet positively when the bar travels in one direction of its reciprocating cycle.

6. A time indicating mechanism comprising a dial, an indicator movable over said dial from a zero position, time-controlled operating means for said indicator including a shaft, means for rotating the shaft in one direction, control means for stopping the rotation of said shaft in said direction when the indicator is at the zero position, and means cooperating with said control means for effecting the rotation of the shaft in the opposite direction for resetting the indicator when the control means stops the rotation of the shaft.

7. A time indicating mechanism comprising a dial, an indicator movable over said dial from a zero position, time-driven operating means for said indicator including a shaft, means for rotating the shaft in one direction, control means for controlling the rotation of said shaft in said direction when the indicator is at the zero position including a switch mechanism to stop the rotation of the shaft, a signal actuated by said switch mechanism, and means cooperating with said control means for controlling the rotation of the shaft in the opposite direction for resetting the indicator when the control means stops the rotation of the shaft.

HORACE LEON IVIE.
JAMES O. IVIE.